United States Patent [19]

Pekau

[11] 4,040,056
[45] Aug. 2, 1977

[54] METHOD FOR ABERRATION-FREE OPTICAL RECORDING OF HIGHLY RESOLVED SONAR OR RADAR MAPS

[75] Inventor: Dietlind Pekau, Krailling, Germany

[73] Assignee: Siemens Aktiengesellschaft, Berlin & Munich, Germany

[21] Appl. No.: 583,460

[22] Filed: June 3, 1975

Related U.S. Application Data

[63] Continuation-in-part of Ser. No. 342,303, March 12, 1973, abandoned.

[30] Foreign Application Priority Data

Mar. 30, 1972 Germany ............................. 2215508

[51] Int. Cl.² .......................... G01S 7/04; G01S 9/02; G02B 27/00
[52] U.S. Cl. .................................... 343/17; 73/67.5 H; 340/5 H; 350/3.5
[58] Field of Search ......................... 340/5 H; 343/17; 73/67.5 H; 350/3.5

[56] References Cited

U.S. PATENT DOCUMENTS

| 2,155,659 | 4/1939 | Jeffree | 73/67.5 H |
| 2,976,362 | 3/1961 | Stamps | 350/6 R |
| 3,519,331 | 7/1970 | Cutrona et al. | 343/5 R |
| 3,631,384 | 12/1971 | Smith, Jr. | 340/5 H |
| 3,685,051 | 8/1972 | Wells | 343/17 |

*Primary Examiner*—Malcolm F. Hubler
*Attorney, Agent, or Firm*—Hill, Gross, Simpson, Van Santen, Steadman, Chiara & Simpson

[57] ABSTRACT

A method for aberration free optical recording of highly resolved sonar or radar maps wherein a series of one-dimensional holograms is recorded as a function of the receiving time with the help of pulsed sonar or radar and is coherently optically reconstructed, and wherein the one-dimensional holograms are reconstructed through the utilization of a cylindrical lens whose axis of rotation forms an angle with the optical axis such that both the image distance and the image enlargement are independent of distance, the angle being equal to the angle formed between the azimuth coordinate and the optical axis.

3 Claims, 1 Drawing Figure

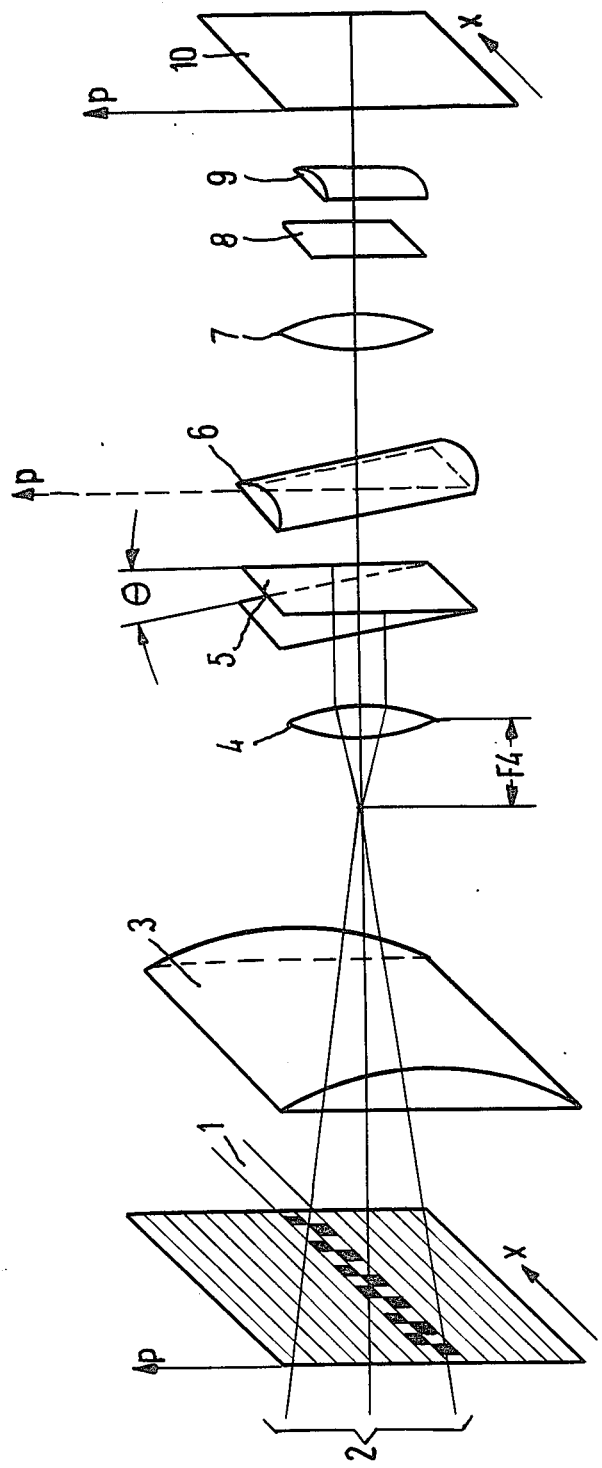

METHOD FOR ABERRATION-FREE OPTICAL RECORDING OF HIGHLY RESOLVED SONAR OR RADAR MAPS

This appication is a continuation-in-part application of application Ser. No. 342,303, filed Mar. 12, 1973, now abandoned.

BACKGROUND OF THE INVENTION

1. Field of the Invention

This invention relates to a method for aberration-free optical recording of highly resolved sonar or radar pictures or maps the term maps being used herein, wherein a series of one-dimensional holograms is recorded as a function of the receiving time through the use of pulsed sonar or radar and are coherently optically reconstructed.

2. Description of the Prior Art

Highly resolved images can be obtained by means of ultrasonic signals with the help of a sonar method, and in particular a side-looking or lateral-view sonar method. In this method, a succession of sonar pulses is transmitted from a vehicle, such as a ship. The echoes of the targets impinged upon by the radiation are received by sound transducers which are arranged parallel to the direction of travel of the vehicle. After a reference signal has been superimposed, which reference signal is coherent with respect to the transmitter, the signals are recorded in such a way that the receiving time is recorded in one coordinate direction while the object coordinate is contained parallel to the vehicle direction in the form of one-dimensional holograms which are aligned with respect to phase. The same principle is also true in connection with other waves, such as high frequency electromagnetic waves, as they are applied, for example, in radar techniques.

Highly resolved sonar or radar maps can be produced by means of coherent optical reconstruction of such one-dimensional holograms and subsequent recording of the object images produced thereby. Since, however, the image distance depends on the object distance during the reproduction of the holograms, the two object coordinates, distance and azimuth, are focused in different planes, whereby the reconstruction plane of the azimuth coordinate extends at an angle to the optical axis. Therefore, a conical lens, as well as a cylindrical lens, is required for the recordation of the object. As the ratio of image distance/object distance approaches the order of magnitude of unity, the required conical lens can be no longer be realized without disadvantageous aberrations.

Furthermore, the distance-dependent object enlargement will cause strong image distortions with the above-mentioned type of recording. The film upon which the one-dimensional radar holograms are recorded can be moved along a conical lens at a constant speed with lateral view radar for the correction of these image distortions, and the radar map can be simultaneously recorded line by line upon a film which is also pulled along behind a slot at a constant speed. However, this method has the drawback that the radar map is recorded line by line, so that the radar image can only by viewed after the holograms have been completely pulled along the conical lens and the film carrying the image has been developed. Furthermore, the slot causes undesirable defraction effects which degrade the resolution.

In order to record the entire sonar or radar map completely and without delay in such a way that the image enlargements and the image distances are independent of object distance, it was suggested in my copending application, Ser. No. 342,302, filed Mar. 12, 1973 now U.S. Pat. No. 3,895,341, to effect a one-dimensional cross correlation of the transmission function of the holograms through the use of a filter which is adapted in accordance with the Fourier transform function of a conical lens. I have found, however, that this method can be improved upon by eliminating the additional component, the adapted filter, and accordingly eliminate the essential production costs due to the defined phase transmission of the element, in addition to the adjustment requirements thereof.

SUMMARY OF THE INVENTION

This invention is therefore based on the task of providing a more simple method for aberration-free optical recording of highly resolved sonar or radar maps of the type mentioned above wherein the entire sonar or radar maps can be completely recorded without distortion and without delay, and further without additional elements as I previously suggested.

For the solution of the above task, I suggest that the one-dimensional holograms be reconstructed with the help of a cylindrical lens whose axis of rotation forms such an angle with the optical axis that both the image distance and the image enlargement are independent of distance.

Therefore, the angle formed by the axis of rotation of the cylindrical lens and the optical axis is equal to the angle which is formed by the reconstruction plane of the azimuth coordinate and the optical axis.

BRIEF DESCRIPTION OF THE DRAWING

Other objects, features and advantages of the invention, its organization, construction and operation will be best understood from the following detailed description of a preferred embodiment thereof taken in conjunction with the accompanying drawing which carries a single figure which illustrates the invention in a coherent optical recording system.

DESCRIPTION OF THE PREFERRED EMBODIMENT

Inasmuch as the image distance is proportional to the object distance in a reproduction of each one-dimensional hologram comprising a plane wave, the reconstruction plane is provided as a function of the receiving time at an angle with respect to the optical axis. For the recordation of the object, this plane must be transposed into the image plane which extends perpendicular to the optical axis.

The principle of the suggested reconstruction method is illustrated in the drawing. Since the distance and azimuth coordinates, which are shown in different planes, are superimposed during the reconstruction of the one-dimensional holograms as a function of the receiving time, the angle between the reconstruction plane of the azimuth coordinate and the hologram plane, which is usually very large, must be reduced. With a large angle between these planes, the opening angle of the correcting lens would also have to be large, a condition which is not generally possible without the occurrence of disadvantageous aberrations.

The one-dimensional holograms are illustrated by a convergent laser beam 2 in the schematic arrangement illustrated in the drawing, in order to carry out the method according to the invention, and are recorded with the help of a short-focus lens 4 positioned at a distance corresponding to its focal length $F_4$ from the focus of the laser beam 2. Simultaneously, the distance coordinate $p$ is increased with the cylindrical lens 3 and the lens 4 and recorded upon the cylindrical lens 6 which is positioned at an angle with respect to the optical axis.

$\theta$ is therefore the angle between the reconstruction plane 5 of the decreased azimuth coordinate $x$ and the perpendicular with respect to the optical axis.

The reconstruction plane of the azimuth coordinate $x$ is recorded in infinity with the help of the cylindrical lens 6 which is positioned at an angle $(90°-\theta)°$ with respect to the optical axis, where $\theta$ is in the range of between 30° and 60°. The image planes of the azimuth and distance coordinates of the object are superimposed with the help of a lens 7 and the cylindrical lens 9, whereby the focal lengths of these lenses are selected in such a way that the increases of both coordinates are equal.

The image enlargement is independent of the object distance due to the application of the tilted cylindrical lens 6, and distortion-free sonar maps 10 can be produced in this manner.

When the one-dimensional holograms are reproduced with the help of a cylindrical lens arranged at an angle with respect to the optical axis, the distance of the reconstruction of each hologram from the cylindrical lens must be equal to the focal length of this cylindrical lens. This condition can only be fulfilled, however, when the distance coordinate of the one-dimensional holograms is recorded upon the cylindrical lens, since otherwise the distance of the reconstruction of a one-dimensional hologram from the cylindrical lens varies. Since the cylindrical lens and the distance coordinate extend at an angle to each other, the latter cannot be recorded for all one-dimensional holograms upon the cylindrical lens.

The maximum distance range for which the method according to the invention is suited results from the conditions that the distance difference of the reconstruction from the cylindrical lens is less than the reconstruction depth clarity and that the enlargement difference, which is caused by this distance difference, does not cuase any object shiftings greater than the resolution ability.

Although I have described my invention by reference to a specific illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for coherently optically reconstructing one-dimensional holograms for sonar or radar maps, comprising the steps of illuminating a one-dimensional hologram with a coherent beam to produce holographic transmission along an optical axis, and transposing a reconstruction plane by an angle into the image plane which is perpendicular to the optical axis so that the image distance and the image enlargement are independent of distance.

2. A method according to claim 1, wherein said step of transposing is further defined as transforming by an angle which is equal to the angle between the azimuth coordinate and the optical axis.

3. A method according to claim 1, wherein the step of transposing is further defined by the step of optically rotating the reconstruction plane with a cylindrical lens having an axis of rotation disposed at an angle with respect to the optical axis.

* * * * *